(12) United States Patent
Nakamura (10) Patent No.: US 10,564,386 B2
(45) Date of Patent: Feb. 18, 2020

(54) LENS CONTROL DEVICE AND LENS CONTROL METHOD

(71) Applicant: OLYMPUS CORPORATION, Hachioji-shi, Tokyo (JP)

(72) Inventor: Makoto Nakamura, Hachioji (JP)

(73) Assignee: Olympus Corporation, Tokyo (JP)

( * ) Notice: Subject to any disclaimer, the term of this patent is extended or adjusted under 35 U.S.C. 154(b) by 203 days.

(21) Appl. No.: 15/429,786

(22) Filed: Feb. 10, 2017

(65) Prior Publication Data

US 2017/0242215 A1    Aug. 24, 2017

(30) Foreign Application Priority Data

Feb. 23, 2016  (JP) .................................. 2016-032207

(51) Int. Cl.
| | | |
|---|---|---|
| *G02B 7/09* | (2006.01) | |
| *H02K 7/06* | (2006.01) | |
| *G02B 7/08* | (2006.01) | |
| *H02K 37/24* | (2006.01) | |
| *H02P 8/24* | (2006.01) | |

(52) U.S. Cl.
CPC ................. *G02B 7/09* (2013.01); *G02B 7/08* (2013.01); *H02K 7/06* (2013.01); *H02K 37/24* (2013.01); *H02P 8/24* (2013.01)

(58) Field of Classification Search
CPC . G02B 7/08; G02B 7/09; H02K 37/24; H02K 7/06; H02P 8/24
See application file for complete search history.

(56) References Cited

U.S. PATENT DOCUMENTS

| | | | | |
|---|---|---|---|---|
| 5,794,085 A | * | 8/1998 | Nomura ................... | G02B 7/08 396/187 |
| 8,270,824 B2 | * | 9/2012 | Nishimura ............... | G03B 3/10 348/348 |
| 9,110,227 B2 | | 8/2015 | Asano | |

(Continued)

FOREIGN PATENT DOCUMENTS

| | | |
|---|---|---|
| JP | 10-066393 A | 3/1998 |
| JP | 2013-025268 | 2/2013 |

OTHER PUBLICATIONS

Office Action from corresponding Japanese Patent Application Serial No. 2016-032207, dated Dec. 12, 2019 (2 pgs.).

*Primary Examiner* — William R Alexander
*Assistant Examiner* — Balram T Parbadia
(74) *Attorney, Agent, or Firm* — John C. Pokotylo; Pokotylo Patent Services (57) ABSTRACT

A lens control device that moves a lens in an optical axis direction comprises a stepping motor that drives the lens, a position detection circuit that detects position of the lens in an optical axis direction, a memory that stores data relating to a relationship between rotational position of the stepping motor and detected position of the position detection circuit, and a controller that designates rotational position of the stepping motor based on target information that is input, determines a virtual target rotational position based on a target position corresponding to detected position of the position detection circuit corresponding to the target information that has been input, and, based on the virtual target rotational position, searches for a rotational position that corresponds to the target position, within a range of given rotational positions of the data.

9 Claims, 10 Drawing Sheets

(56) References Cited

U.S. PATENT DOCUMENTS

| | | | |
|---|---|---|---|
| 2006/0104624 A1* | 5/2006 | Nakata | G02B 7/04 396/137 |
| 2007/0133970 A1* | 6/2007 | Honjo | G02B 7/08 396/97 |
| 2008/0165431 A1* | 7/2008 | Kokabu | G02B 7/102 359/697 |
| 2010/0165479 A1* | 7/2010 | Ishikawa | G02B 7/102 359/683 |
| 2013/0027791 A1* | 1/2013 | Asano | H02P 8/32 359/824 |
| 2014/0247384 A1* | 9/2014 | Hokkezu | G02B 7/36 348/345 |
| 2016/0079897 A1* | 3/2016 | Imaizumi | H02P 8/24 |

* cited by examiner

//  LENS CONTROL DEVICE AND LENS CONTROL METHOD

Benefit is claimed, under 35 U.S.C. § 119, to the filing date of prior Japanese Patent Application No. 2016-032207 filed on Feb. 23, 2016. This application is expressly incorporated herein by reference. The scope of the present invention is not limited to any requirements of the specific embodiments described in the application.

BACKGROUND OF THE INVENTION

1. Field of the Invention

The present invention relates to a lens control device and a lens control method that cause movement of a lens in an optical axis direction using a stepping motor.

2. Description of the Related Art

Conventionally, in an imaging apparatus or the like, a stepping motor is used to move a lens in an optical axis direction. A stepping motor has a drive shaft that is rotated in accordance with a number of drive pulses that have been input, with a number of drive pulses corresponding to a distance to a drive target position being applied to the stepping motor to move the lens to the target position.

In this way, conventionally, lens drive is carried out using open loop control that uses a stepping motor. However, in a stepping motor a rotational position of a rotational axis of the motor with respect to an excitation position of the motor does not have a linear relationship, due to the effects of detent torque, which is an inherent load torque, variation in movement load etc., and an offset between the two may sometimes arise. In order to resolve this situation, improvement to drive control precision using closed loop control has been proposed (refer, for example, to Japanese patent publication No. 2013-025268 (hereafter referred to as patent publication 1)).

The closed loop control of a drive control unit such as shown in patent publication 1 requires drive current correction processing, and as well as the structure of this processing becoming complicated, processing takes up a lot of time.

SUMMARY OF THE INVENTION

An object of the present invention is to provide a lens control device and lens control method that are capable of accurate lens control with a simple structure.

A first aspect of the present invention is a lens control device that move a lens in an optical axis direction, comprising a stepping motor that drives the lens, a position detection circuit that detects position of the lens in an optical axis direction, a memory that stores data relating to a relationship between rotational position of the stepping motor and position detected by the position detection circuit, and a controller that designates rotational position of the stepping motor based on target information that is input, determines a virtual target rotational position based on a target position for detected position of the position detection circuit corresponding to the target information that has been input, and, based on the virtual target rotational position, retrieves a rotational position that corresponds to the target position, within a given range of rotational positions of the data.

A second aspect of the present invention is a lens control method for a lens control device having a stepping motor that moves the lens in an optical axis direction, a position detection circuit that detects position of the lens in the optical axis direction, and a memory that stores data relating to a relationship between rotational position of the stepping motor and detected position of the position detection circuit, comprising determining a virtual target rotational position based on a target position corresponding to detected position of the position detection circuit corresponding to target information that has been input, retrieving a rotational position that corresponds to the target position, within a range of given rotational positions of the data, based on the virtual target rotational position, and designating a rotational position of the stepping motor based on a rotational position that has been retrieved.

DETAILED DESCRIPTION OF THE PREFERRED EMBODIMENTS

An example where a digital camera is adopted as one embodiment of the present invention will be described in the following. This camera converts a subject image, that has been formed by an optical lens within a lens barrel section, to image data using an imaging section, subjects the subject image to live view display on a display that is arranged on the rear surface of a camera body, based on this converted image data, and stores image data for a still picture or movie in a storage medium. In tandem with a half press operation of a release button or the like, focus detection is carried out using a contrast method or phase difference method etc., and an optical lens is moved to an in-focus position using drive of a stepping motor in accordance with the result of focus detection.

Figure 10:
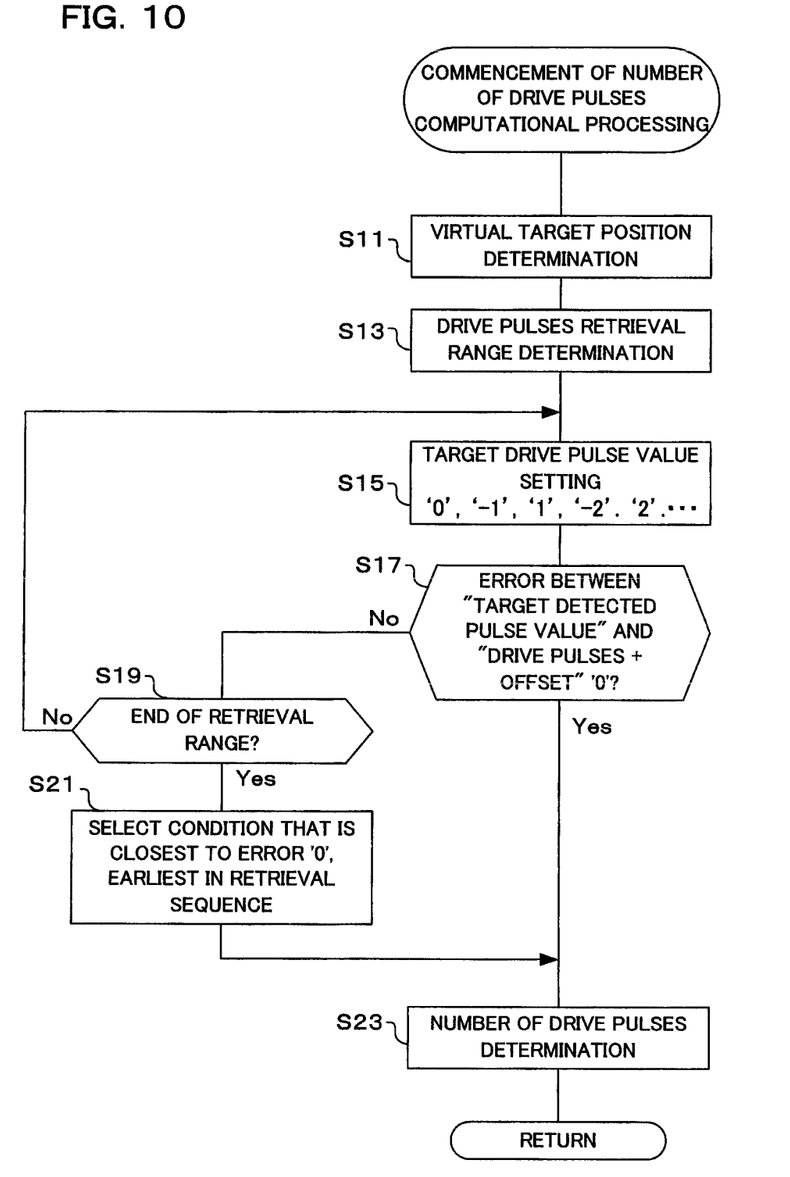
FIG. 10 is a flowchart showing number of drive pulses computational processing of the camera of one embodiment of the present invention.

When moving to the in-focus position of the optical lens etc., virtual target rotational position is determined based on movement destination (target position) of the lens (refer, for example, to virtual target position in FIG. 7 and S11 in FIG. 10), rotational position corresponding to the target position is retrieved based on this virtual target rotational position (refer, for example, to retrieval range in FIG. 8 and S17 and S19 in FIG. 10), and a number of drive pulses (rotational position) of the stepping motor is determined based on this retrieved rotational position and instructed to a motor drive circuit, which will be described later (refer to S23 in FIG. 10).

Figure 1:
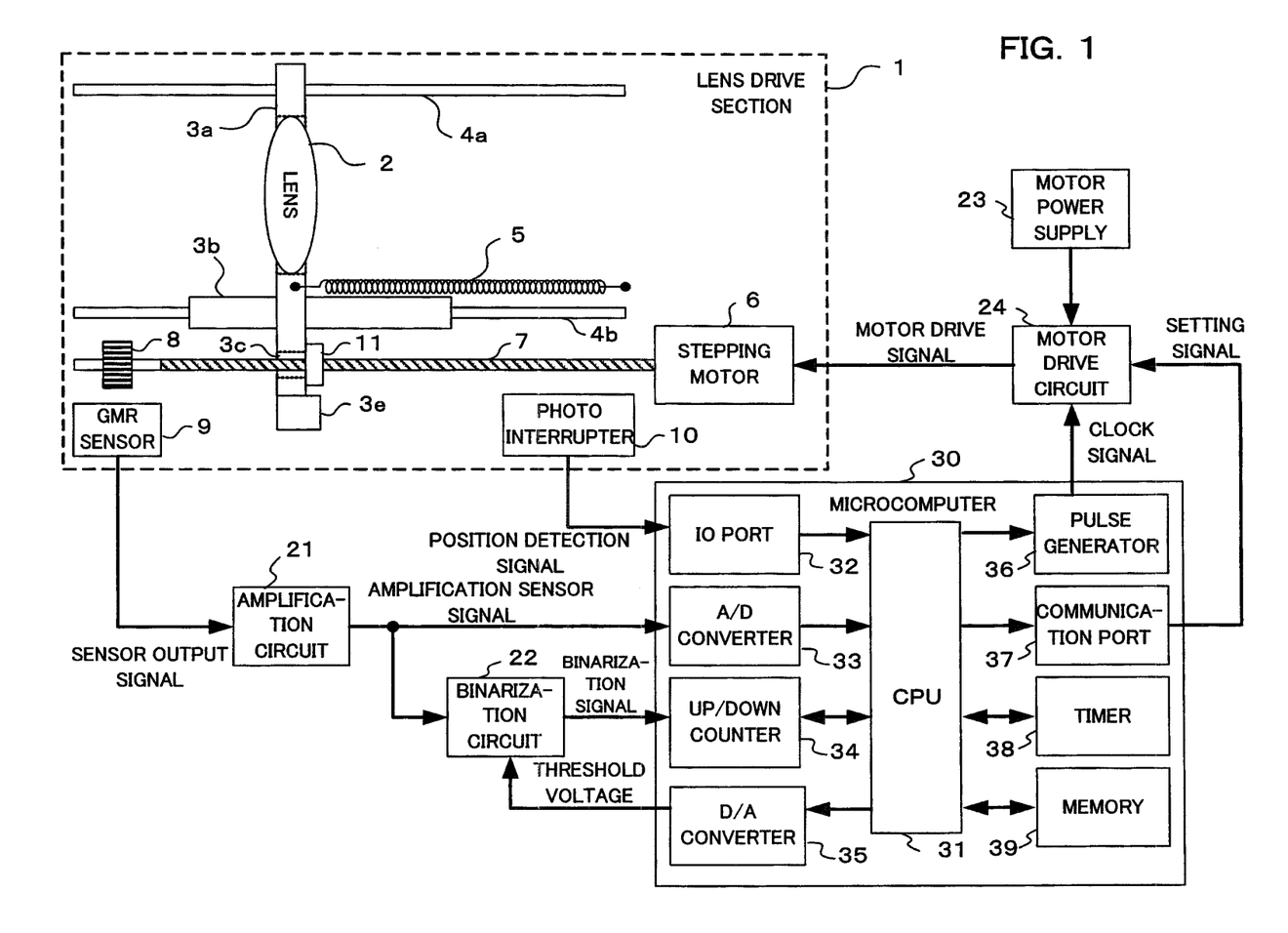
FIG. 1 is a block diagram showing the structure of a camera of one embodiment of the present invention.

A preferred one embodiment using a camera to which the present invention has been applied will be described in the following in accordance with the drawings. FIG. 1 is a block diagram showing the mechanical structure of a lens drive section of a camera of one embodiment of the present invention, and mainly showing the electrical structure relating to lens drive of the camera.

A lens drive section 1 is arranged inside a camera with a built-in lens or inside the interchangeable lens of an interchangeable lens camera. Inside the lens drive section 1 there are provided an optical lens (hereafter abbreviated to "lens"), a lens frame 3, guide shafts 4a, 4b, a spring 5, stepping motor 6, lead screw 7, scale magnet 8, GMR (Giant Magneto Resistive Effect) sensor 9, and photo-interrupter 10.

The lens 2 has a plurality of or a single optical lens, and forms a subject image. The lens 2 is held in the lens frame 3. The guide shaft 4a and the guide shaft 4b that is provided parallel to the guide shaft 4a are shafts that extend in the optical axis direction of the lens 2, and are fixed to a lens barrel or the like. The lens 2 is suspended from a spring 5, and is provided between the lens frame 3 and a fixing member of the lens barrel, and is energized toward the right side against the lens frame in the drawing.

The previously described lens frame 3 has a fixed section 3a that extends in a direction orthogonal to the optical axis direction of the lens 2, and an engagement section 3b, that is integral with this fixed section 3a, and is engaged with the guide shaft 4b. The lens frame 3 also has a through hole 3c through which the lead screw 7 passes, and a light shielding wing 3e. The light shielding wing 3e is integral with the fixed section 3a and is provided on one end of the fixed section 3a. The light shielding wing 3e shields light that has been projected from a light emitting section of the photo-interrupter 10 when the lens 2 has been moved to a reference position.

The stepping motor 6 receives a two-phase pulse signal that is made up of an A phase and a B phase, as a motor drive signal, from a motor drive circuit (motor driver) 24, and performs rotational drive. The stepping motor 6 is a stepping motor that drives the lens. A rotational drive shaft of the stepping motor 6 is integral with the lead screw 7. As a result the lead screw 7 is rotated forwards and backwards in response to the motor drive signal that has been applied to the stepping motor 6.

If the lead screw 7 is turned backwards or forwards, the lens 2 is moved in the optical axis direction by means of a nut 11 that has been meshed with the lead screw 7. This nut 11 is separate from the lens frame 3. The lens frame 3 is drawn in the right direction in FIG. 1 by the spring 5, and reaches a state where a periphery of the through hole 3c becomes abutted against the nut 11 that is meshed with the lead screw 7. Since a rotation stop (not shown) for the nut 11 is provided on the lens frame 3, if the lead screw 7 is rotated the nut 11 is moved in the left or right direction, and the lens frame 3 insinuated against the nut 11 is also moved in the optical axis direction.

The scale magnet 8 is provided integrally on one end of the lead screw 7, and has S poles and N poles magnetized alternately along the circumferential surface. The GMR sensor 9 is arranged at a position opposite to the scale magnet 8, and outputs a two-phase signal in accordance with magnetic fields generated by the S poles and N poles of the scale magnet 8. A relative rotational position of the stepping motor 6 (relative position of the lens 2 in the optical axis direction) can be detected based on detection signals of the scale magnet 8 and the GMR sensor 9. The scale magnet 8 and the GMR sensor 9 function as a position detection circuit that detects position of the lens in an optical axis direction.

The photo-interrupter 10 is fixed to a lens barrel or the like, and has a light emitting section (including light emitting elements) and a light receiving section (including light receiving sensors). If the lens 2 is moved to a reference position, projected light from the light emitting section is shielded by the light shielding wing 3e. The light receiving section changes output when a light shielding state is reached, and as a result it is possible to detect that the lens 2 is at the reference position. Specifically, it is possible to detect absolute position of the lens 2 using the light shielding wing 3e and the photo-interrupter 10. A position detection signal from the photo-interrupter 10 is output to an IO port 32.

In this way, with the lens drive section 1 of this embodiment the nut 11 is moved linearly by rotation of the lead screw 7 that is driven by the stepping motor 6, and the lens frame 3 is moved along the guide shafts 4a and 4b by the urging force of the spring 5. As a result the lens 2 that is fixed to the lens frame 3 is moved in the optical axis direction. Also, the scale magnet 8 is attached to a tip end of the lead screw 7 at a position opposite to the GMR sensor 9, and if the lead screw rotates forward or backward the scale magnet 8 also rotates in the same direction.

Output of the GMR sensor 9 is connected to an amplifier circuit 21. The amplifier circuit 21 respectively amplifies two-phase analog sensor output signals from the GMR sensor 9, and carries out noise removal processing for the sensor signals. Amplified sensor signals that have been processed by the amplifier circuit 21 are output to an A/D converter 33 and a binarization circuit 22.

The binarization circuit 22 respectively performs binarization on the two-phase sensor output signals from the amplifier circuit 21, and outputs binarized signal to an up/down counter (two-phase counter) 34. In the binarization, the binarization circuit 22 is input with a threshold voltage from a D/A converter 35, and performs binarization using this threshold voltage.

A microcomputer 30 has a CPU (Central Processing Unit) 31 and peripheral circuits for the CPU, and carries out overall lens drive control. Specifically, the microcomputer 30 generates various signals for drive of the stepping motor 6 in response to various signals from the lens drive section 1, for example. As peripheral circuits, an I/O (input/output) port 32, an A/D (analog/digital) converter 33, up/down counter 34, D/A (digital/analog) converter 35, pulse generator 36, communication port 37, timer 38, and memory 39 are provided.

The CPU 31 outputs a setting signal for controlling rotational position of the stepping motor 6 in accordance with movement destination of the lens 2, as will be described later (refer, for example, to FIG. 9 and FIG. 10). Specifically, the CPU 31 functions as a controller for instructing rotational position of the stepping motor based on target information that has been input. Also, this controller determines a virtual target rotational position based on target position corresponding to detected position of a position detection section corresponding to target information that has been input (refer, for example to FIG. 7 and S11 in FIG. 10), and retrieves a rotational position corresponding to target position, within a given range of rotational position of data, based on this virtual target rotational position (refer, for example, to FIG. 8 and S13-S23 in FIG. 10). The given range of rotational position mentioned above corresponds to one cycle of electric angle of the stepping motor (refer, for example, to FIG. 4 and S19 in FIG. 10).

Figure 8:
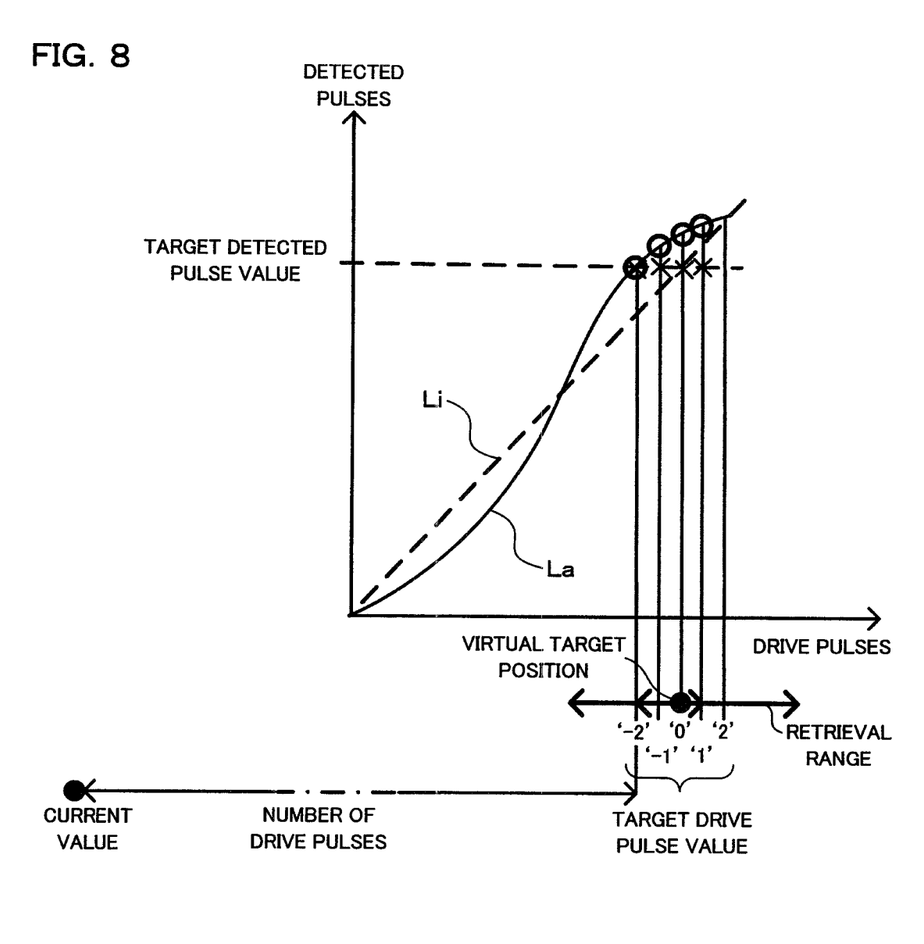
FIG. 8 is a graph for describing how to obtain a number of drive pulses of the stepping motor, in the camera of one embodiment of the present invention.

The above described controller also determines virtual target rotational position based on target position corresponding to detection position of the position detection section, based on reference data using a relationship between rotational position of the stepping motor and detected position of the position detection section as a reference (refer, for example, to FIG. 8 and S11 in FIG. 10). The controller also obtains a detected position for a case where rotational position is offset by a given offset amount from the virtual target rotational position based on data, and retrieves a rotational position at which the obtained detected position coincides with the target position (refer, for example, to FIG. 8 and S17 in FIG. 10). The controller also obtains a detected position for a case where rotational position is offset by a given offset amount from the virtual target rotational position based on data, and retrieves a rotational position at which a difference between the obtained detected position and the target position is minimum, within a given range of rotational position of data (refer, for example, to S21 in FIG. 10).

The 10 port 32 is input with a position detection signal from the photo-interrupter 10, and based on this position detection signal outputs a signal indicating that the lens 2 is at a reference position to the CPU 31.

The A/D converter 33 is input with A phase and B phase amplification sensor signals from the amplifier circuit 21, carries out AD conversion on the respective signals to convert the A phase and B phase amplification sensor signals to digital data, and outputs the digital data to the CPU 31.

The D/A converter 35 is input with a digital value corresponding to the threshold voltage from the CPU 31, converts this digital value to an analog voltage, and outputs as a threshold voltage to the binarization circuit 22. There may be situations where a midpoint potential of the amplification sensor signal is offset due to characteristics of the GMR sensor 9 and due to the amplifier circuit 21. For this reason a midpoint potential for the A phase and B phase is previously stored in the memory 39 as an adjustment value, and the binarization circuit 22 carries out binarization using the midpoint potential as a threshold voltage.

The up/down counter 34 is input with a binarization signal from the binarization circuit 22 and carries out up/down counting. The GMR sensor 9 outputs A phase and B phase sensor signals, and carries out up/down counting each time a binarization signal is input. In this way it is possible to determine whether the scale magnet 8 rotates forward or rotates backwards, that is, it is possible to determine in which direction the lens 2 is moving.

The memory 39 has an electrically rewritable volatile memory (for example, a DRAM (Dynamic Random Access Memory) etc.) and an electrically rewritable nonvolatile memory (for example, flash ROM (Flash Read Only Memory) etc.). Programs for execution by the CPU 31, and various data such as various adjustment values for the lens (for example, values relating to the previously described midpoint potential) and setting values for lens drive etc. are stored in the memory 39. Data (adjustment values) representing a relationship between position pulse of the stepping motor (rotational position) and detected pulses from the GMR sensor 9 (detected position) are stored as a setting value for lens drive. The data representing this relationship will be described later using FIG. 4 to FIG. 6. The memory 39 functions as a memory that stores data relating to a relationship between rotational position of the stepping motor and detected position of the position detection circuit.

The timer 38 generates control cycles for feedback control, and performs timing operations for carrying out measurement of time for various operations of the lens. The timer 38 also has a calendar function. The communication port 37 is a port for carrying out the exchange of signals externally to the CPU 31. With this embodiment various communication is carried out by means of the communication port 37, for example transmission of setting signals from the communication port 37 to a motor drive circuit 24.

The pulse generator 36 receives control signals from the CPU 31 and generates a clock signal (pulse signal) that is output to the motor drive circuit 24 for use in drive of the stepping motor 6. Specifically, the pulse generator 36 outputs a clock signal to the motor drive circuit 24 and advances excitation position of the stepping motor.

The motor drive circuit 24 receives supply of a power supply voltage from the motor power supply 23, and is also input with a clock signal from the pulse generator 36 and setting signals from the communication port 37, and outputs a motor drive signal made up of two phase voltage signals to the stepping motor 6. Also, when outputting the motor drive signal, the motor drive circuit 24 carries out adjustment of a maximum applied voltage for the motor drive signal based on a setting signal from the CPU 31. The motor power supply 23 has a power supply such as a battery, and supplies power to the motor drive circuit 24 by making a constant voltage using a constant voltage circuit or the like.

In generating the motor drive signal, the CPU 31 within the microcomputer 30 carries out computation based on a sensor output signal that has been detected by the GMR sensor 9, and carries out various computational processing on digital data that is required in management of drive pulses output by the motor drive circuit 24, setting of drive speed, setting of drive voltage, and feedback control.

Next relative positions of excitation position and the shaft of the stepping motor of this embodiment will be described. In the case where the stepping motor is rotated, a relationship between motor rotation shaft rotational position and excitation position of the motor is not an ideal linear relationship. As a result, there may be situations where there is deviation in an ideal rotational position corresponding to excitation position. This deviation is dependent on excitation position of the motor, and is periodically repeated.

Figure 2:
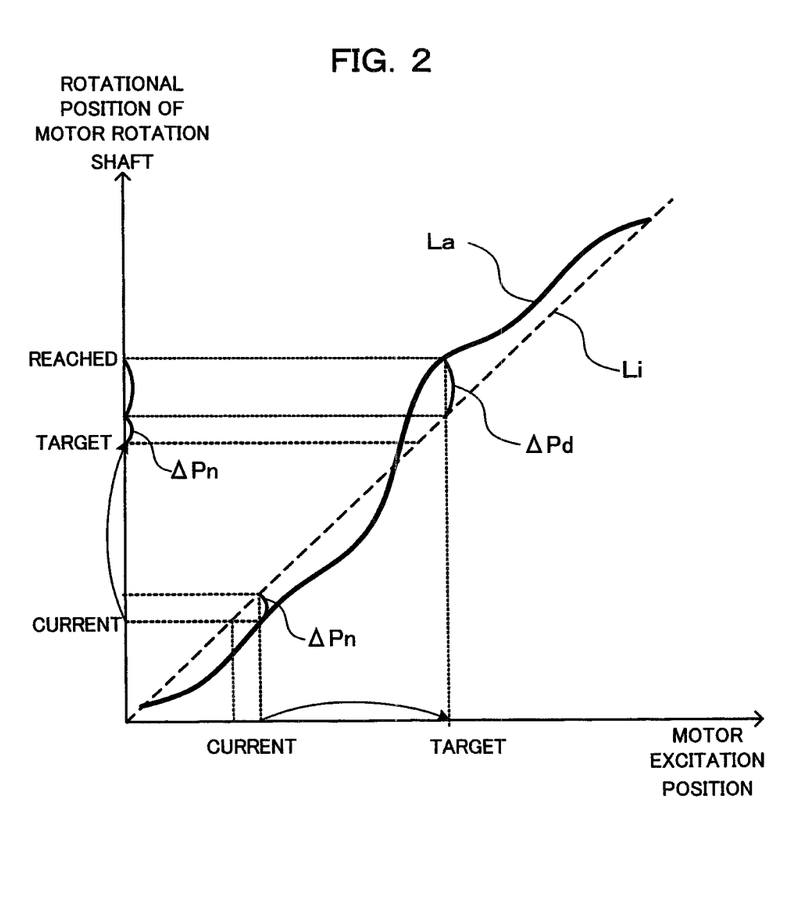
FIG. 2 is a graph showing a relationship between excitation position of the stepping motor and rotational position of the motor rotation shaft, in a camera of one embodiment of the present invention.

FIG. 2 is a graph showing one example of a relationship between excitation position of the stepping motor and rotational position of the motor rotation shaft. The horizontal axis of this graph represents motor excitation position, while the vertical axis represents rotational position of the motor rotation shaft. In FIG. 2, the dashed line Li shows the case of an ideal linear relationship, which is a case where excitation position change amount and rotational axis rotational position change amount are equal. In actual fact, excitation position change amount and rotational axis rotational position change amount are not equal, due to various circumstances. Specifically, as shown by the solid line La, there is an error $\Delta Pn$ at a rotational position of the motor rotation shaft with respect to current motor excitation position, and an error $\Delta Pd$ also arises at a rotational position of the motor rotational axis with respect to excitation position after the motor has been rotated and reached another position.

Figure 3:
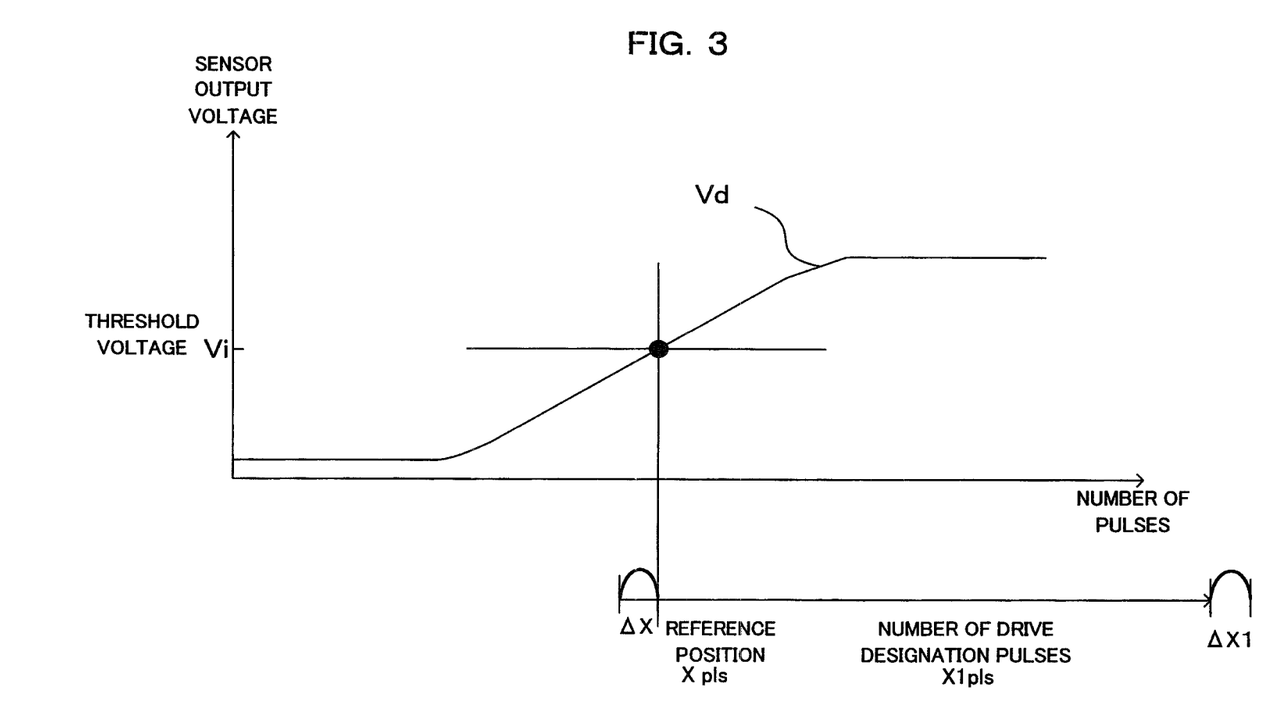
FIG. 3 is a drawing for describing lens position management using the stepping motor, in the camera of one embodiment of the present invention.

FIG. 3 is a drawing for describing a general lens position management method. A position at which an output voltage Vd from a sensor that has been provided for managing absolute position of the lens 2 (with this embodiment, the photo-interrupter 10) exceeds a threshold voltage value Vi and a level is changed is made a reference position Xpls. Lens position is managed with a number of pulses that have driven the stepping motor 6 from this reference position Xpls.

With the example shown in FIG. 3, at the reference position Xpls a drive instruction number of pulses Xlpls are applied to the stepping motor 6 depending on the target position (target detected pulses, drive target pulses). However, as was described previously, errors arise in the reference position Xpls and in the target position. Accordingly, as shown in FIG. 3, not only is an error superimposed on the drive pulses at the reference position, and error is also superimposed on the movement destination, and stopping the lens at the intended position is difficult.

Figure 4:
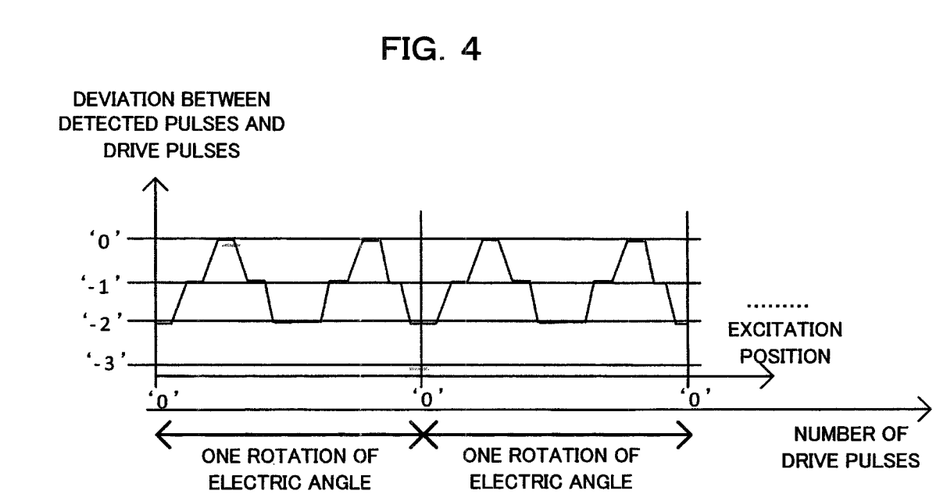
FIG. 4 is a graph that shows that there is periodicity in offset between stepping motor detected pulses and drive pulses, in the one embodiment of the present invention.

Next, the periodic nature of deviation in detected pulses and drive pulses will be described using FIG. 4. As was described using FIG. 2, with the stepping motor there is not necessarily an ideal linear relationship between the excitation position and the rotational position. As a result an offset arises such that a number of drive pulses output to the stepping motor 6 does not coincide with a number of pulses that have been detected by the GMR sensor 9 in accordance with movement of the lens 2. Deviation between the drive pulses and the detected pulses has a periodic nature with respect to excitation position of the stepping motor 6, and repeats periodically every single rotation of the electric angle.

Figure 9:
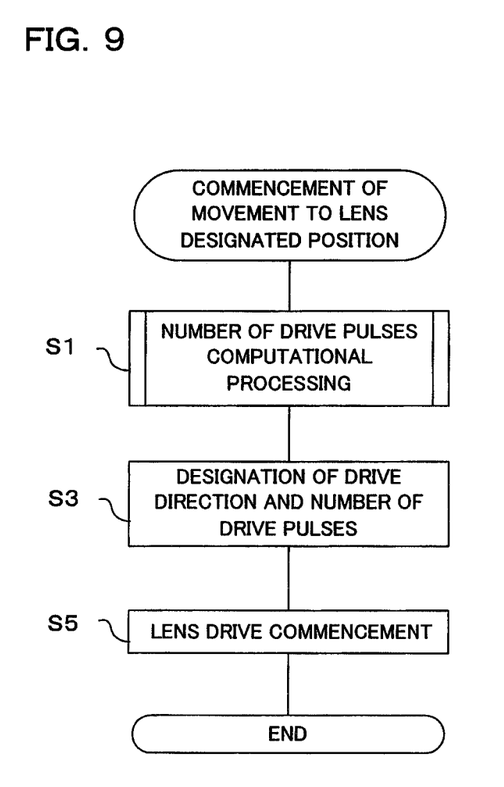
FIG. 9 is a flowchart showing lens drive operation of the camera of one embodiment of the present invention.

With this embodiment, deviation between drive pulses and detected pulses for a single rotation of the electric angle for each excitation position is stored in the memory 39 as an adjustment value, and is used when obtaining a number of drive pulses that takes into consideration a deviation from the detected pulses (refer to S1 in FIG. 9, and FIG. 10).

Next, load variation of the spring 5 and offset correction will be described using FIG. 5. As was described using FIG. 3 the lens frame 3a that holds the lens 2 is pulled to the right side of the drawing by the spring 5. This means that magnitude of the load due to the spring 5 varies depending on position of the lens 2. If the load of the spring varies, a relationship between drive pulses and detected pulses varies.

Figure 5:
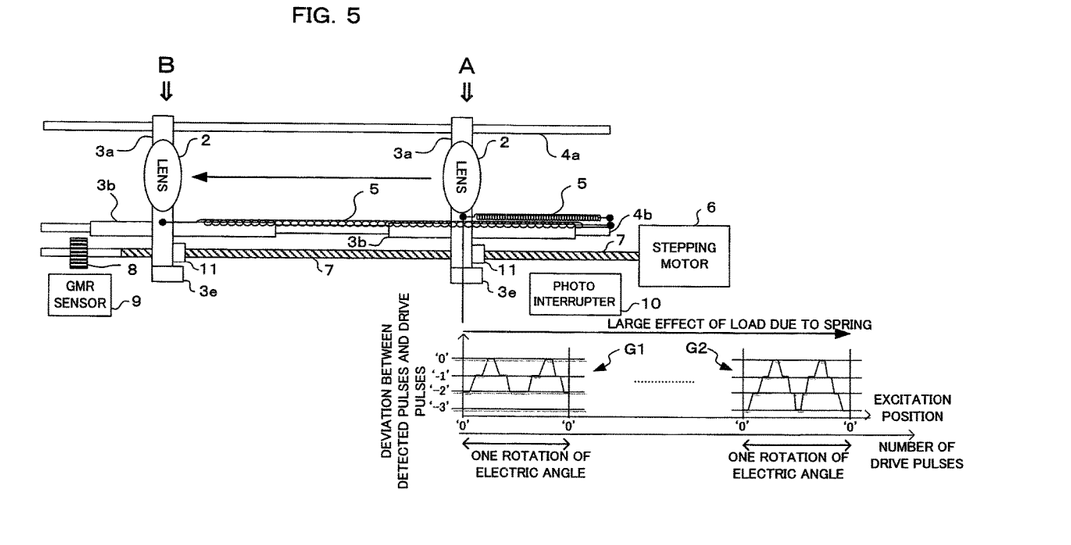
FIG. 5 is a drawing showing variation in offset in accordance with lens position, in a case where there is a load due to a spring, in the camera of one embodiment of the present invention.

The graphs G1 and G2 shown in FIG. 5 show variation in deviation between detected pulses and drive pulses. This deviation is in accordance with electric angle, and has periodicity for every single rotation of electric angle. Graph G1 shows a case where the effect of load due to the spring is small, while graph G2 shows the case where the effect of spring load is large. With graph G1 where the effect of load due to the spring is not so large, deviation between detected pulses and drive pulses is in a range of "−2" to "0". However, in graph G2 where the effect of load due to the spring is large, the deviation between detected pulses and drive pulses is in a wider range of from "−3" to "0".

With this embodiment therefore, adjustment values for both ends of the lens movement range (in the case of a focus lens a single rotation of the electric angle for the infinity end and the close-up end) are stored in the memory 39, and between these two values linear interpolation is carried out using lens position. In this way it is possible to accurately correct deviation even if there is variation in the magnitude of the load due to the spring.

Next, load fluctuation in a case of differing urging directions by the spring 5, and offset correction, will be described using FIG. 6. Since the lens 2 is constructed suspended from the spring 5, the direction in which a load acts will differ in accordance with a direction in which the lens 2 pulls the spring 5 (direction (Da) in the drawing) and a direction in which the lens 2 is pulled by the spring 5 (direction (Db) in the drawing).

Figure 6:
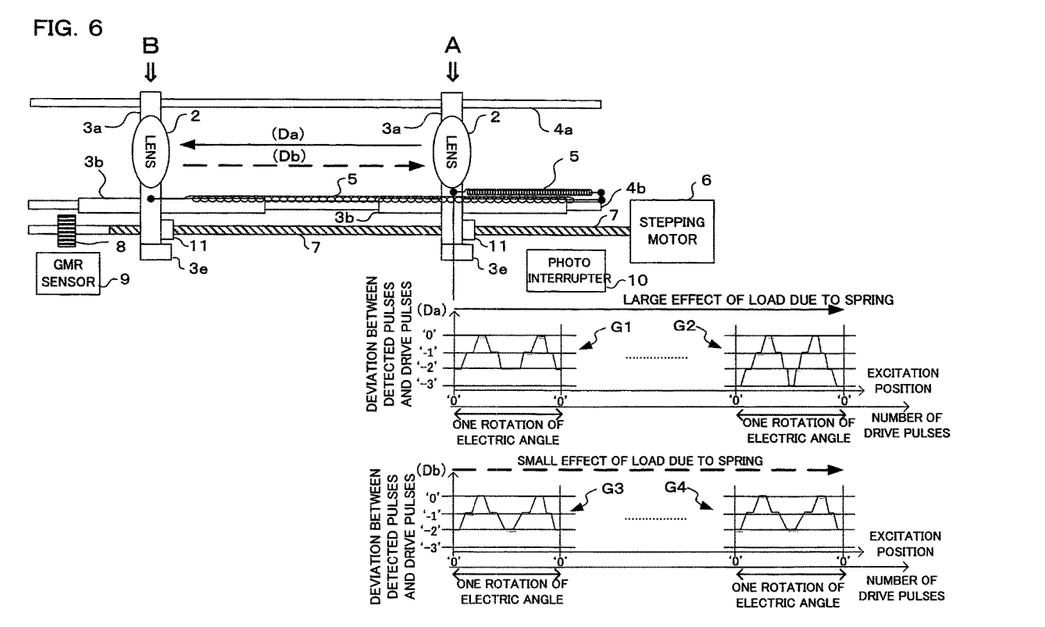
FIG. 6 is a drawing showing variation in accordance with direction in which load is applied, in a case where there is a load due to a spring, in the camera of one embodiment of the present invention.

With the example shown in FIG. 6, in the case of the direction in which the lens 2 pulls the spring 5 (direction (Da) in the drawing), the effect of load due to the spring is large and deviation between detected pulses and drive pulses becomes as shown in the graphs G1 and G2. On the other hand, in the case of the direction in which the lens is pulled by the spring (direction (Db) in the drawing), the effect of load due to the spring is comparatively small and deviation between detected pulses and drive pulses becomes as shown in graphs G3 and G4.

With this embodiment, by storing adjustment values in accordance with amount of deviation between drive pulses and detected pulses that arises depending on drive direction of the lens 2, accurate correction is performed suppressing the influence of drive direction. Specifically, adjustment values for both ends of the lens movement range (in the case of a focus lens a single rotation of the electric angle for the infinity end and the close-up end) are stored in the memory 39 for each drive direction, and between these two values linear interpolation is carried out in accordance with lens position. In this way it is possible to accurately correct deviation even if the magnitude of load due to the spring varies with drive direction.

It should be noted that adjustment values are measured within a range of a single rotation of the electric angle at both ends of the movement range of the lens, for both drive directions, namely two directions, and stored in the memory 39. Also, this measurement divides within a range of a single rotation of the electric angle into a given number, and a difference between drive pulses (number of pulses that have been applied to the stepping motor 6) and detected pulses (number of pulses that have been detected by the GMR sensor 9) is obtained for each divided region. This difference that has been obtained for each divided region is an offset between detected pulses and drive pulses, and is stored in the memory 39 as an adjustment value. This adjustment value is measured in advanced at the factory shipping stage, and stored in the memory 39.

Next, a method of obtaining a number of drive pulses to be applied to the stepping motor 6, in order to stop the lens 2 at a designated position, using an adjustment value, will be described using FIG. 7 and FIG. 8.

Figure 7:
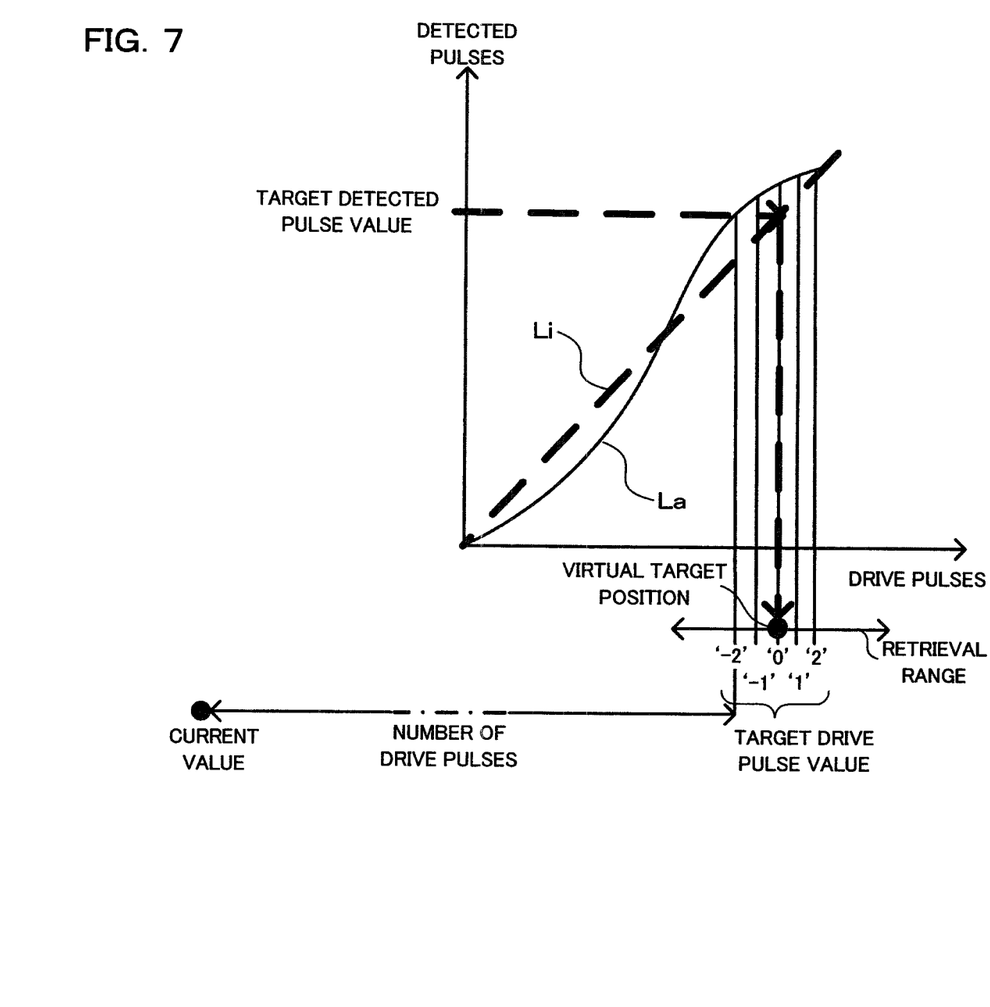
FIG. 7 is a graph for describing reference position (virtual target position) when obtaining a number of drive pulses of the stepping motor, in the camera of one embodiment of the present invention.

First, as shown in FIG. 7, for a target detected pulse value, which is a target pulse value for detected pulses, a position where the drive pulses and the detected pulses coincide is set as a virtual target position. The virtual target position is made a center position when obtaining number of drive pulses.

In FIG. 7, the target detected pulse value corresponds to a position that is set as a target for movement destination of the lens 2. This target detected pulse value is set using the CPU 31 within the camera body or the like. The solid line La represents a relationship of actual detected pulses with respect to drive pulses, and includes deviation between drive pulses and detected pulses. On the other hand, the dashed line Li represents a case where the drive pulses and the detected pulses have a linear relationship. The virtual target position corresponds to a drive pulse position when the dashed line Li and the target detected pulse value coincide.

If virtual target position has been determined a number of drive pulses for target detected pulse value is obtained taking into consideration deviation between drive pulses and detected pulses. In FIG. 8, with a target drive pulse value for virtual target position as a center ('0'), the target drive pulse value is gradually changed in the order −1, 1, −2, 2, . . . from the center (for example, in the case of −1, target drive pulse value=target drive pulse value−1), and a target drive pulse value at which an error between a value (value on La) that is derived by adding a detection offset (difference between La and Li corresponding to each target drive pulse value) to each target drive pulse value and the target detected pulse value becomes 0 is searched for. Search is then terminated when the error becomes 0 and a value that is derived by adding the detection offset to the target drive pulse value coincides with the target detected pulse value. By adopting this method it is possible to shorten the time taken in searching.

Specifically, detection offset is used in reading out an adjustment value corresponding to detection offset that is stored in the memory 39. An adjustment value corresponding to the target drive pulse value that is made the virtual target position is read out, a pulse value corresponding to the solid line La is calculated using this adjustment value, and a difference (error) between this pulse value and the target detected pulse value is calculated. In a case where the error is not 0, corresponding adjustment values are respectively read out at positions (target drive pulse value) corresponding to a position adjacent to the virtual target position (in FIG. 7, '−1' and '1'). A pulse value corresponding to the solid line La is then calculated using this adjustment value, and a difference (error) between this pulse value and the target detected pulse value is calculated. In a case where the error is not 0, then an error is similarly calculated at a the next adjacent position (target drive pulse value), and a target drive pulse value where the error becomes 0 is obtained. With the example shown in FIG. 8, the error becomes 0 at a target drive pulse value corresponding to '−2', and a number of drive pulses is determined based on this target drive pulse value.

However, the range in which the target drive pulse value varies (retrieval range) is limited to one rotation of the electric angle with the virtual target position as a center. Therefore, in a case where there is not a condition that an error within that retrieval range becomes '0', among search positions where the error becomes closest to '0' within the retrieval range, a condition that is earliest in a retrieval sequence is selected. By restricting the retrieval range to a single rotation of the electric angle there is no wasted time expended in the retrieval. Since the adjustment value (detection offset) varies cyclically, a retrieval range of a single electric angle rotation is sufficient. Also, if resolution of the drive pulses is made higher than that of the detected pulses it is possible to calculate drive pulses with better precision, and it is possible to stop the lens at a more accurate position.

Next, drive operation to a lens designated position will be described using the flowcharts shown in FIG. 9 and FIG. 10. These flowcharts are executed by the CPU 31 controlling each section within the microcomputer 30 and each section within the camera in accordance with programs that have been stored in the memory 39.

If the flow shown in FIG. 9 is commenced, first number of drive pulses computational processing is carried out (S1). Here, as was described using FIG. 7 and FIG. 8, the CPU 31 calculates a number of drive pulses (number of pulses applied to the stepping motor 6) in order to reach a lens designated position, using an adjustment value that has been stored in the memory 39. Detailed operation of this number of drive pulses computational processing will be described later using FIG. 10.

If number of drive pulses computational processing has been carried out, next designation of drive direction and number of drive pulses is carried out (S3). Here, the CPU 31 outputs drive direction and number of drive pulses that were calculated in step S1 to the motor drive circuit 24, in order to drive the stepping motor 6 using the motor drive circuit 24.

If designation of drive direction and number of drive pulses has been carried out, next lens drive is commenced (S5). Here, the CPU 31 instructs commencement of lens drive to the motor drive circuit 24. Once this instruction has been carried out, the motor drive circuit 24 outputs a motor drive signal to the stepping motor 6 and lens drive is commenced. Once lens drive has commenced this flow is terminated.

Next, operation of the number of drive pulses computational processing of step S1 will be described using FIG. 10. If the flow shown in FIG. 10 is commenced, first a virtual target position is determined (S11). Here, as was described using FIG. 7, a virtual target position is determined based on the target detected pulse value. It should be noted that the target detected pulse value is determined in accordance with a lens movement destination that has been made a target.

Once the virtual target position has been determined, next a drive pulses retrieval range is determined (S13). Here, as was described using FIG. 7, within a given range adjacent to the virtual target position is determined as a retrieval range. It should be noted that this retrieval range is narrowed to a single electric angle rotation.

Once the drive pulses retrieval range has been determined, next a target drive pulse value is set (S15). Here a target drive pulse value corresponding to a region ('0', '−1', '1', '−2', '2') adjacent to the virtual target position is obtained, and this value is set. The target drive pulse value is determined in accordance with a distance from a current position to the target position, and can be obtained by referencing a table that is stored in the memory 39. It should be noted that in step S15, generally, all target drive pulse values are not set, and instead a target drive pulse value is sequentially set each time processing returns from step S19.

If the target drive pulse value has been set, it is next determined whether or not an error between "target detected pulse value" and "drive pulses+offset" is "0" (S17). Here, "target detected pulse value" is determined by movement destination of the lens, as was described previously. Also, "drive pulses+offset" is obtained by the CPU 31 in the following manner. Specifically, the CPU 31 reads out adjustment values corresponding to each divided region within the retrieval range ('0', '−1', '1', '−2', '2') from the memory 39, and calculates "drive pulses+offset" for each divided region by adding (or subtracting) the target drive pulse value that was set in step S15 to (or from) this adjustment value. This "drive pulses+offset" is on a line representing a relationship that includes detection offset shown on the solid line La in FIG. 7.

In step S17, if the "target detected pulse value" and "drive pulses+offset" have been obtained, it is determined whether or not an error (difference) between the two is '0'.

If the result of determination in step S17 is that the error is not '0', it is next determined whether or not it is the end of the retrieval range (S19). As was described previously, the retrieval range is the range of a single electric angle rotation, with virtual target position as a center. In this step it is determined whether or not errors between "target detected pulse value" and "drive pulses+offsets" have been calculated within the retrieval range. If the result of this determination is that it is not the end of the retrieval range, processing returns to step S15, the next target drive pulse value is set, and the above described processing is executed.

On the other hand, if result of determination in step S19 is that it is the end of the retrieval range, next a condition that is closest to an error of '0' and is earliest in the retrieval sequence is selected (S21). In previously described step S17, there may be cases where the end of the retrieval range is reached without detecting a drive pulse value at which error becomes '0'. In this case, a drive pulse value that has an error that is closest to '0', and that us earliest in the retrieval sequence (closest to the virtual target position) is selected.

If a condition that has an error that is closest to '0' and is earliest in the retrieval sequence has been selected in step S21, or if the result of determination in step S17 is that the error has become '0', next the number of drive pulses is determined (S23). In the event that the error has become '0' in step S17, number of drive pulses is determined based on a target drive pulse value for which the error became '0', and in the event that a condition such as being closest to an error of '0' was selected in S21 the number of drive pulses is determined based on that target drive pulse value. Once the number of drive pulses has been determined this flow is terminated and the originating flow is returned to.

As has been described above, with the one embodiment of the present invention, virtual target rotational position (refer, for example, to FIG. 8 and S11 in FIG. 10) is determined based on target position that is equivalent to a detected position (detected pulses) of a position detection circuit corresponding to target information that has been input, a rotational position corresponding to the target position is retrieved (for example, FIG. 8 and S15 and S17 in FIG. 10) within a given range of rotational position data (for example, S19 in FIG. 10) based on this virtual target rotational position, and rotational position for a stepping motor is instructed based on the rotational position that has been retrieved (for example, S3 in FIG. 9 and S23 in FIG. 10).

Also, with the one embodiment of the present invention, after movement destination of a lens has been instructed, as a step prior to outputting designation of drive direction and number of drive pulses, computational processing is carried out, based on a detection value of a sensor (GMR sensor 9) for detecting lens drive amount, such that a difference between a pulse value at a current position and a pulse value and a target stopped position becomes a number of drive pulses. Since it is possible to stop a lens at an intended stopped position with a single operation by utilizing this method, there is no wasted time, and it is possible to stop the lens with good precision.

It should be noted that with the one embodiment of the present invention, a condition that is closest to an error of '0' and that is earliest in a retrieval sequence has been selected, but this is not limiting and another condition may be used, for example less than or equal to a given error, or a condition such as closest to the virtual target position. Also, although the adjustment values stored in the memory 39 are values corresponding to the graphs G1-G4 shown in FIG. 6, this is not limiting, and only G1 and G2 may be stored with G3 and G4 being calculated based on G1, and adjustment values at an intermediate points between G1 and G2 may be added and stored.

Also, with the one embodiment of the present invention, the GMR sensor 9 has been used for rotational position detection, but this is not limiting and any sensor may be used that is capable of detecting position, such as an optical encoder.

Also, with this embodiment, an imaging device has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc. In any event, it is possible to adopt the present invention as long as a device carries out drive control of a lens.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A lens control device that moves a lens in an optical axis direction, comprising:
    a stepping motor that drives the lens,
    a position detection circuit that detects a position signal corresponding to position of the lens in an optical axis direction,
    a memory that stores data relating to a relationship between rotational position of the stepping motor and detected position of the position detection circuit, and
    a controller that designates rotational position of the stepping motor based on target information that is input, determines a virtual target rotational position based on a target position corresponding to detected position of the position detection circuit corresponding to the target information that has been input, and, based on the virtual target rotational position, retrieves a rotational position that corresponds to the target position, within a given range of rotational position of the data, without driving the stepping motor, wherein:

the controller calculates a detected position for a case in which rotational position is offset by a given offset amount from the virtual target rotational position based on the data, and either (A) retrieves a rotational position at which the detected position calculated coincides with the target position, or (B) retrieves a rotational position at which a difference between the calculated detected position and the target position is minimum, within a given range of rotational position of the data.

2. The lens control device of claim 1, wherein:
the given range of rotational position corresponds to one cycle of an electric angle of the stepping motor.

3. The lens control device of claim 1, wherein:
the controller determines virtual target rotational position based on target position corresponding to detection position of the position detection section, based on reference data in a relationship in which a relationship between rotational position of the stepping motor and detected position of the position detection circuit constitutes a reference.

4. A lens control method for a lens control device having a stepping motor that moves the lens in an optical axis direction, a position detection circuit that detects position of the lens in an optical axis direction, and a memory that stores data relating to a relationship between rotational position of the stepping motor and detected position of the position detection circuit, comprising:
determining a virtual target rotational position based on a target position that corresponds to detected position of the position detection circuit corresponding to target information that has been input,
retrieving rotational position corresponding to the target position, based on the virtual target rotational position, within a given range of rotational position of the data without driving the stepping motor, and
instructing rotational position of the stepping motor based in the retrieved rotational position, further comprising:
calculating a detected position for a case where rotational position is offset by a given offset amount from the virtual target rotational position based on the data, and either (A) retrieving a rotational position at which the detected position calculated coincides with the target position, or (B) retrieving a rotational position at which a difference between the calculated detected position and the target position is minimum, within a given range of rotational position of the data.

5. The lens control method of claim 4, wherein:
the given range of rotational position corresponds to one cycle of an electric angle of the stepping motor.

6. The lens control method of claim 4, further comprising:
determining virtual target rotational position based on target position corresponding to a detection position, based on reference data using a relationship between rotational position of the stepping motor and detected position as a reference.

7. A non-transitory computer-readable medium storing a processor executable code, which, when executed by at least one processor, performs a lens control method for a lens control device, which includes a stepping motor that moves the lens in an optical axis direction, a position detection circuit that detects position of the lens in an optical axis direction, and a memory that stores data relating to a relationship between rotational position of the stepping motor and detected position of the position detection circuit, the lens control method comprising:
determining a virtual target rotational position based on a target position that corresponds to detected position of the position detection circuit corresponding to target information that has been input,
retrieving rotational position corresponding to the target position, based on the virtual target rotational position, within a given range of rotational position of the data, without driving the stepping motor, and
instructing rotational position of the stepping motor based in the retrieved rotational position, further comprising:
calculating a detected position for a case where rotational position is offset by a given offset amount from the virtual target rotational position based on the data, and either (A) retrieving a rotational position at which the detected position calculated coincides with the target position, or (B) retrieving a rotational position at which a difference between the calculated detected position and the target position is minimum, within a given range of rotational position of the data.

8. The non-transitory computer-readable medium of claim 7, wherein:
the given range of rotational position corresponds to one cycle of an electric angle of the stepping motor.

9. The non-transitory computer-readable medium of claim 7, further comprising:
determining virtual target rotational position based on target position corresponding to detection position of the position detection section, based on reference data in a relationship in which a relationship between rotational position of the stepping motor and detected position of the position detection circuit constitutes a reference.

* * * * *